United States Patent
Breebaart

(10) Patent No.: US 10,037,588 B2
(45) Date of Patent: Jul. 31, 2018

(54) METHOD AND SYSTEM FOR EMBEDDING AND DETECTING A PATTERN

(71) Applicant: CIVOLUTION B.V., Eindhoven (NL)

(72) Inventor: Dirk Jeroen Breebaart, Eindhoven (NL)

(73) Assignee: KANTAR SAS (FR)

( * ) Notice: Subject to any disclaimer, the term of this patent is extended or adjusted under 35 U.S.C. 154(b) by 859 days.

(21) Appl. No.: 14/383,486

(22) PCT Filed: Mar. 18, 2013

(86) PCT No.: PCT/NL2013/050201
§ 371 (c)(1),
(2) Date: Sep. 5, 2014

(87) PCT Pub. No.: WO2013/141702
PCT Pub. Date: Sep. 26, 2013

(65) Prior Publication Data
US 2015/0043768 A1   Feb. 12, 2015

Related U.S. Application Data

(60) Provisional application No. 61/613,562, filed on Mar. 21, 2012.

(30) Foreign Application Priority Data

Mar. 21, 2012 (NL) ...................... 2008511

(51) Int. Cl.
*G06T 1/00* (2006.01)
*H04N 1/32* (2006.01)
*G10L 19/018* (2013.01)

(52) U.S. Cl.
CPC .......... *G06T 1/0092* (2013.01); *G06T 1/0028* (2013.01); *G10L 19/018* (2013.01); *H04N 1/32149* (2013.01); *H04N 1/32267* (2013.01); *G06T 2201/0065* (2013.01)

(58) Field of Classification Search
CPC ... G06T 1/0092; G06T 1/0028; G10L 19/018; H04N 1/32149; H04N 1/32267
See application file for complete search history.

(56) References Cited

U.S. PATENT DOCUMENTS

2004/0234157 A1   11/2004   Forman et al.
2009/0074242 A1*   3/2009   Yamamoto ....... H04N 21/23892
                                                382/100

OTHER PUBLICATIONS

Unoki, Masashi, et al. "Design of IIR all-pass filter based on cochlear delay to reduce embedding limitations." Intelligent Information Hiding and Multimedia Signal Processing (IIH-MSP), 2010 Sixth International Conference on. IEEE, 2010.*

(Continued)

*Primary Examiner* — Kim Vu
*Assistant Examiner* — Molly Delaney
(74) *Attorney, Agent, or Firm* — Barnes & Thornburg LLP

(57) ABSTRACT

A method of embedding a pattern as a watermark into a content segment. Prior to modifying the content segment, an impulse response of a filter to be used for detecting the pattern is determined; the time-reversed impulse response of the filter is inserted into the segment as the set of imperceptible features; wherein the filter is an infinite impulse response filter having a semi-white frequency spectrum and provides a pseudo-random time-domain response.

12 Claims, 2 Drawing Sheets

(56) References Cited

OTHER PUBLICATIONS

Arnold et al.; A Phase Modulation Audio Watermarking Technique; Information Hiding; 2009; pp. 102-116; vol. 5806 of Lecture Notes in Computer Science; Springer Berlin, Heidelberg.
Faundez-Zanuy et al.; Speaker Identification Security Improvement by Means of Speech Watermarking; Pattern Recognition; Feb. 16, 2007; pp. 3027-3034; vol. 40, No. 11; Elsevier.
Jung et al.; Robust Watermarking for Compressed Video Using Fingerprints and Its Applications; International Journal of Control, Automation, and Systems; Dec. 2008; pp. 794-799; vol. 6, No. 6.
Larbi et al.; A New Wiener Filtering Based Detection Scheme for Time Domain Perceptual Audio Watermarking; IEEE International Conference on Acoustics, Speech and Signal Processing (ICASSP); 2004; pp. 949-952; vol. 5.
Unoki et al.; Reversible Watermarking for Digital Audio Based on Cochlear Delay Characteristics; Seventh International Conference on Intelligent Information Hiding and Multimedia Signal Processing; Oct. 14, 2011; pp. 314-317.
Search Report for International Patent Application No. PCT/NL2013/050201; dated Jun. 13, 2013.

* cited by examiner

METHOD AND SYSTEM FOR EMBEDDING AND DETECTING A PATTERN

PRIORITY CLAIM

This patent application is a U.S. National Phase of International Patent Application No. PCT/NL2013/050201, filed 18 Mar. 2013, which claims priority to Dutch Patent Application No. 2008511, filed 21 Mar. 2012, and U.S. Provisional Application No. 61/613,562, filed 21 Mar. 2012, the disclosures of which are incorporated herein by reference in their entirety.

FIELD OF THE INVENTION

The invention relates to a method of embedding a pattern as a watermark into a content segment, comprising modifying the content segment to insert a set of substantially imperceptible features that relate to the pattern.

The invention further relates to a method of detecting a pattern representing a payload 10 embedded as a watermark into a content segment, comprising detecting a set of substantially imperceptible features that relate to the pattern in the content segment.

The invention further relates to systems for implementing the methods of the invention and to computer program products for causing a computer to execute the methods of the 15 invention.

BACKGROUND OF THE INVENTION

Watermarking is a technique whereby a payload is represented as one or more watermark 20 patterns that are subsequently embedded in content such as movies, pictures, songs, or radio and television shows. The content is then distributed e.g. by broadcast, streaming, downloading or similar technique or on a storage medium such as a CD, DVD, Blu-Ray disc, flash memory or hard disk. The embedding is usually imperceptible: a person who views or hears the content generally will be unable to pick up the embedded pattern. In some cases, 25 some small parts of the embedded patterns may be perceptible, e.g. as minor degradations in audio or video quality. This pattern is typically a (pseudo) random pattern, although this may depend on the application and technique for embedding and detecting. However, specialized detection tools can reconstruct the pattern and recover the payload from the reconstruction. Watermarking has many applications, for example tracing the source and 30 distribution path of content items, audience measurement, synchronization of media streams, enriching content with metadata or providing a basis for digital rights management.

A watermarking application consists of two stages. The first is an embedder, which adds a watermark to the content. During this embedding stage, a certain message or an amount of 35 information (often referred to as 'payload') is represented as a prescribed set of changes that are applied to the content. The second stage is a detector, which extracts the information that was embedded in the content.

One important class of watermarking techniques is referred to as spread-spectrum watermarking. A characteristic property of spread-spectrum watermarking methods is that a relatively small amount of information (the payload) is represented by a sequence of patterns which often have a large bandwidth (e.g., the embedded pattern comprises non-zero components across a wide range of signal frequencies), such that the associated watermark energy density can be very small. In an additive spread-spectrum audio watermarking application, a payload is represented by two or more pseudo-random patterns that are added (by summation) to the audio (host) signal.

Known additive watermarking algorithms embed patterns that are detected using a matched filter, comprising correlation with a set of candidate patterns. The advantages of such methods are their virtually unlimited set of independent patterns that can be embedded, and the flexibility in terms of pattern properties (size, bandwidth, etc). A disadvantage is that detection is in most cases associated with a significant computational complexity due to the correlation operation. Moreover, as this correlation operation is performed most efficiently in a block-wise manner using a discrete Fourier transform, synchronization of analysis blocks and the watermarks embedded in the audio content is crucial for good detection performance.

An alternative to additive watermarking is phase modulation watermarking. Instead of embedding a pattern by addition of the pattern to the content segment, phase modulation modifies the phase of individual frequency components of the content segment according to the phase of the frequency components of the pattern. This method is described in more detail in M. Arnold, P. Baum, and W. Voessing. "A phase modulation audio watermarking technique". In S. Katzenbeisser and A.-R. Sadeghi, editors, Information Hiding, volume 5806 of Lecture Notes in Computer Science, pages 102-116. Springer Berlin/Heidelberg, 2009. Just like in the additive embedding method, the detection process of this phase modulation method constitutes correlation with a set of candidate patterns.

SUMMARY OF THE INVENTION

An object of the invention is to provide a more efficient watermarking embedding and detection implementation.

The invention achieves this object by a method of and system for embedding which is characterized in that prior to modifying the content segment, an impulse response of a filter to be used for detecting the pattern is determined; the time-reversed impulse response of the filter is inserted into the segment as the set of imperceptible features; wherein the filter is an infinite impulse response filter. In an embodiment, the filter can be characterized by a semi-white frequency spectrum and provides a pseudo-random time-domain response.

The invention further achieves this object by a method of and system for detecting which is characterized in that a filter is applied to the content segment, the filter being an infinite impulse response filter. In an embodiment, the filter can be characterized by a semi-white frequency spectrum and providing a pseudo-random time response, and the output of the filter is processed to obtain the pattern from which the payload can potentially be reconstructed.

With the invention, one embeds a pattern that has specific characteristics. This pattern changes sequentially, that is different patterns will be embedded in different audio segments. The order of these patterns relates to the payload, thus effectively achieving an embedding of the payload as a watermark. Various advantageous embodiments of constructing the pattern are elaborated upon below. The invention is based on the insight that the correlation operation normally used in watermarking has similarities with the convolution operation of applying an finite-impulse response onto an input signal to obtain a filtered signal.

A watermark detector correlates candidate watermark sequences, denoted as $w_i[n]$, with watermarked content to determine the most likely sequence. The detector typically comprises a matched-filter for a set of candidate watermark patterns. For one or more candidate patterns i, each of the associated sequence of pseudo-random patterns $w_i[n]$ is correlated with the input signal y[n] as $$r_i = \max_n \sum_t y[x+n]w_i[t] \qquad \text{Eq. 1}$$

where $r_i$ denotes the correlation between pattern $w_i$ and signal.

In a convolution operation one applies a finite-impulse response h[t] onto an input signal y[n] to obtain a filtered signal z[n]:

$$z[n] = \sum_t y[n-t]h[t] \qquad \text{Eq. 2}$$

This equation can be re-formulated as:

$$z[n] = \sum_t y[n+t]h[-t] \qquad \text{Eq. 3}$$

When one substitutes $h[-t]=w_i[t]$ the result is identical to a correlation operation as described above. Thus, one can use a (convolution) operation as detector if the time-reversed impulse response of that filter is used in the embedding stage. More importantly, besides the use of convolution (which represents a filtering operation with a finite impulse response), the filter operation at the detector may also be implemented as a filter structure with feedback loops, e.g. an infinite impulse response (IIR) filter, as long as the time inverse of the impulse response of the filter was embedded. This insight is new and not suggested by the prior art.

The article 'A new Wiener filtering based detection scheme for time domain perceptual audio watermarking' by S. Larbi, M. Jaïdane, N. Moreau (IEEE International Conference on Acoustics, Speech and Signal Processing (ICASSP), Montreal, Canada, 2004, 5:949-952) discloses detection method for a spread spectrum and perceptual watermarking system that employs a Wiener de-convolution filter. The paper discloses applying spectral shaping of a watermark sequence in the embedder (according to a psychoacoustic masking level), and to undo this operation in the detector. The embedded pattern itself is filtered by this IIR filter, but the sequence of the pattern is not related to the filter response.

The article 'Robust Watermarking for Compressed Video Using Fingerprints and Its Applications' by Sooyeun Jung, Dongeun Lee, Seongwon Lee and Joonki Paik (International Journal of Control, Automation, and Systems, vol. 6, no. 6, pp. 794-799, December 2008) discloses a user identification method at H.264 streaming using watermarking with fingerprints and notes that the trade-off between an infinite-impulse response (IIR) filter and a finite-impulse response (FIR) one is that the former requires much lower orders for a given desired specification. The paper discloses embedding a watermark in the low spatial frequency range. In the detector, they filter out the high frequencies from the image (which do not contain the watermark) using an infinite impulse response filter. Just like in the previously cited paper, the impulse response filter is used as pre-processing step to improve the detection and not for using the detection itself.

US patent application 20040234157 discloses a process where objects are detected in an image using a spatially variant filter. In one embodiment the filter is an infinite impulse response difference of Gaussian filters. The size of the filter is adjusted based on the portion of the image being processed by the filter. No discussion is made of imperceptible features. This process is not suitable for watermarking.

The filter comprises at least one feedback connection. This means that instead of the conventional FIR filter structures to compute the correlation between audio signal and candidate pattern (without feedback), the method is based on the use of infinite impulse response (IIR) filters. In FIR filter structures, the output of the filter only depends on the input by means of an inner product of the input signal with a set of filter coefficients. For IIR filters, on the other hand, the output of the filter depends on both the input as well as the output generated previously. This property is often described by means of a feedback connection in the filter structure. An important advantage of IIR filter structures is that the desired filter characteristics can often be realized with a reduced number of coefficients compared to a FIR filter structure, resulting in a reduction in computational and memory complexity.

In a further embodiment the filter comprises plural all pass delay sections, for example arranged in a cascade. This has the advantage of low computational complexity. For example, a cascade of 6 all-pass-delay sections requires only 6 delays and 12 multiply-accumulates for each audio input sample, which is in many cases significantly less (depending on the filter length) than frequency-domain correlation (requiring forward and backward FFTs).

In a refinement of this embodiment the filter involves two or more such cascades in parallel, in which each cascade is configured to detect one specific pattern. In such application, a sequence of watermark patterns can be retrieved. For example, an embedder may be configured to embed one out of two candidate patterns in each content segment, in which the pattern index is dependent on the value of payload bits. To recover which pattern was embedded in a content segment, the content segment is processed by both filter cascades. The output of the cascades is subsequently used to determine which pattern was embedded in the content segment.

The two or more cascades may optionally provide semi-orthogonal impulse responses, and the embedder embeds one of the two cascades. This provides an advantageous construction of the patterns that relate to the payload. The payload in this embodiment determines which one out of a set of different (inverted) impulse response is used in the content segment. The selection of the filter should depend on the payload.

Preferably one or more of the respective impulse responses is modified prior to embedding, the modification being dependent on the payload. This embodiment combines two (inverted) impulse responses. While the two patterns are the same, the payload now determines the relative delay between the two responses. As soon as the relative delay is applied, a single pattern related to the payload is obtained that can be embedded.

Optionally information concerning the relationship between the responses of the two or more cascades is embedded as the payload. This information may concern e.g. a relative delay between the responses or the relative phase or sign of the two or more patterns.

Preferably the impulse response of the filter is truncated at an arbitrary point. In theory the IIR response is of infinite length, hence truncation is usually appropriate.

The invention further provides systems for implementing the methods of the invention and computer program products for causing a computer to execute the methods of the invention.

BRIEF DESCRIPTION OF THE FIGURES

The invention will now be discussed in more detail with reference to the figures, in which FIG. 1 schematically shows a system for embedding a pattern as a watermark into a segment of a content item.

DETAILED DESCRIPTION

Figure 1:
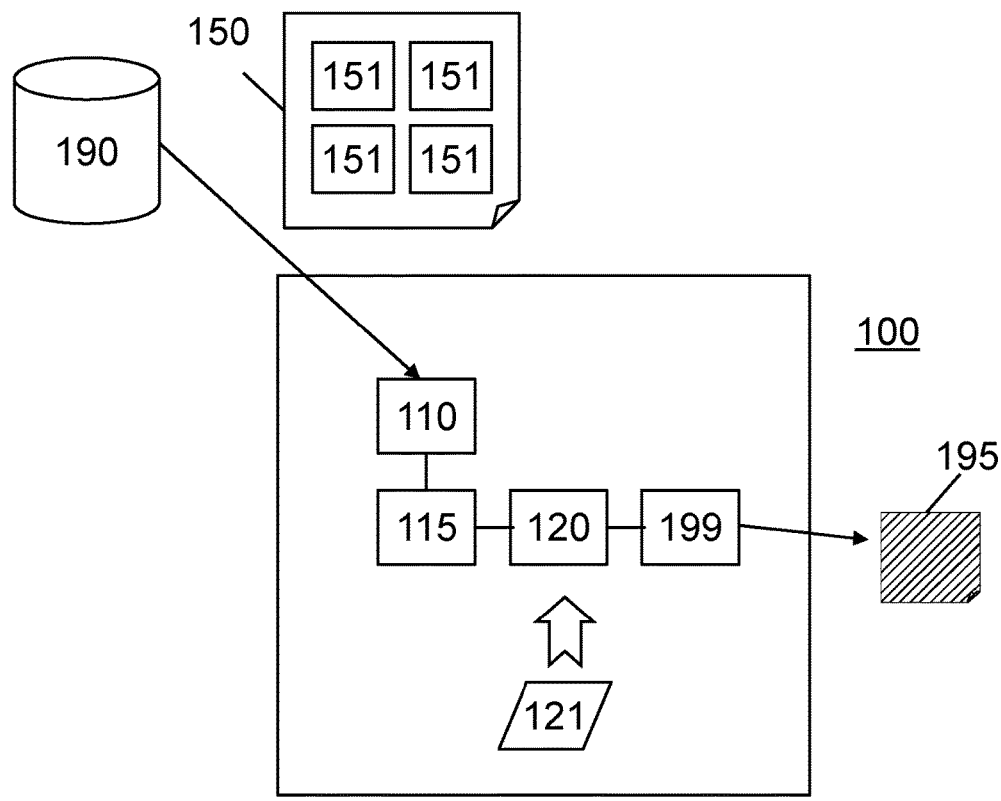

FIG. 1 schematically shows a system 100 for embedding a pattern 110 as a watermark into a segment 151 of a content item 150, such as movies, pictures, songs, or radio and television shows. The system 100 to this end comprises a reading module 110 that reads the content 150 from a source 190, e.g. a local storage medium or a remote location. An embedding module 120 is configured to modify the content segment 151 to insert a set of substantially imperceptible features that relate to a pattern 121.

The pattern 121 represents a payload that is to be associated with the content 150. The payload can be any item of information that is to be carried in the content 150. A popular kind of payload is an identifier of the content 150, or of the originator, rights holder and/or distributor of the content 150, for example as an alphanumeric name or as symbolic string of characters that is translated to a name and/or other identifying information using an external translation table. If such a payload is extracted, the identifier can be used to identify the appropriate party.

However, the payload does not have to be the same in all segments; the payloads of each of the plural segments 151 may and preferably are mutually different. For example the payloads may comprise segment identifiers that increase sequentially from one segment to the next. The payloads may also comprise time codes, for example relative to an initial segment to allow a detection of where relatively speaking in the content 150 the segment occurs. The time codes may also be absolute and thus allow identification of the time that the segment was distributed, for example its original broadcast time.

A payload may also be a combination of static and changing information. For example, an unchanging identifier of the content 150 and/or its originator or rights holder may be combined with a segment-specific identifier such as a time code. This allows for each segment the identification of the content 150, originator or rights holder (or the like) and the segment-specific information such as its position in the content 150 or its time of distribution.

Different methods to represent a payload by two or more pseudo-random sequences are known. One preferred method is to represent individual payload bits (or combinations of payload bits) by different (orthogonal) pseudo-random patterns. Another is to embed two pseudo-random patterns in which their relative time delay represents the payload. The resulting sequence of pseudo-random patterns is added to the host signal. This summation process can be implemented in various ways, i.e., patterns can be added consecutively in time or frequency, can be mixed, or can be time and/or frequency interleaved.

Irrespective of the employed method to map a payload to a set of pseudo-random sequences and the method of combining these sequences into a single watermark, we can write the resulting watermark as a vector w[n] with n the sample index that is added to a host signal x[n]:

$$y[n]=x[n]+w[n] \qquad \text{Eq. 4}$$

In many practical cases, the watermark sequence w[n] will be changed in level before addition to the host signal x[n] to control the audibility/robustness trade-off. Moreover, this process is preferably performed as a function of both time and frequency to exploit the concept of auditory masking.

Prior to the embedding module 120 modifying the content segment 151, a filter module 115 determines an impulse response of a filter to be used for detecting the pattern 121. More particularly, the filter is an infinite impulse response filter which can be characterized by a semi-white frequency spectrum and provides a pseudo-random time-domain response. Preferably the filter module 115 will truncate this impulse response to an arbitrary length, e.g. related to the payload to be embedded.

The embedding module 120 is, in accordance with the present invention, configured for inserting the time-reversed impulse response of the filter into the segment as the set of imperceptible features. The information concerning the relationship between the responses of the two or more filters that are embedded is representative of the payload. This information preferably relates to a relative delay between the responses or the relative phase or sign of the two or more patterns. The working of the filter is elaborated upon below with reference to FIG. 3 and further.

In an embodiment the filter comprises plural all pass delay sections. This plurality may be arranged in a cascade. Alternatively or in addition, two or more filters may provide semi-orthogonal impulse responses. In such a case, the embedding module 120 inserts at least one of these responses when modifying the content segment 151.

Having modified the content segment 151, the system 100 may repeat the modification operation as described above with further content segments. When the modification operations are all completed, the end result, being watermarked content 195, is provided to an output 199. The output 199 can be a storage medium, e.g. a DVD disc to which the content 195 is written or recorded. Alternatively the output 199 is a transmission medium such as the internet over which the content 195 is distributed to further entities.

Figure 2:
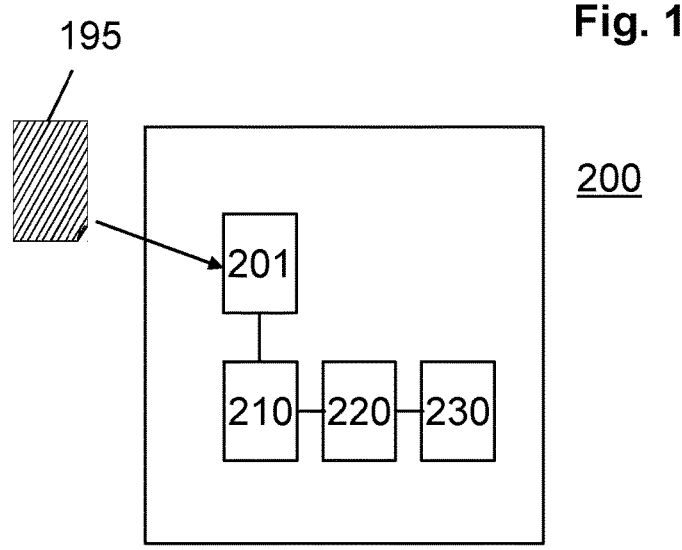
FIG. 2 schematically illustrates a system for detecting the pattern representing a payload embedded as a watermark into the content segment.

FIG. 2 schematically illustrates a system 200 for detecting the pattern 121 representing a payload embedded as a watermark into a content segment 151. This system 200 provides the converse of the system 100.

The system 200 comprises an input 201 at which a segment of the watermarked content 195 is presented. The input 201 could comprise a network connection to gain access to content downloadable from the Internet or similar source, or a connection to television and/or radio broadcasts. Alternatively the input 201 could be a connection to a storage medium on which content is stored.

The system 200 further comprises a detecting module 230, which is configured to detect a set of substantially imperceptible features that relate to the pattern 121 in the content segment 151. Detecting these features allows the pattern 121 to be recovered, which in turn allows a determination of the payload associated with the content segment 151. As noted above, the payload could be unique for each segment 151 or be the same for all segments part of a content item 150.

In accordance with the invention, the system 200 further comprises a filter module 210, configured for applying to the content segment a filter, more particularly an infinite impulse response filter which can be characterized by a semi-white frequency spectrum and providing a pseudo-random time response.

The filter module 210 is connected to a processing module 220 which is configured to process the output of the filter to obtain the pattern 121 from which the payload can potentially be reconstructed. Preferably plural filters are applied to the content segment 151 multiple times, each filter outputting a different candidate pattern. Then the processing module 220 takes the response that has the best match with one candidate pattern as the pattern from which the payload can be reconstructed. Said reconstruction is subsequently done at the detecting module 230.

In the filter module 210, for one or more candidate payload bits i, each of the associated sequence of pseudo-random patterns $w_i[n]$ is correlated with the host signal:

$$r_i = \max_n \sum_t y[t+n] w_i[t] \quad \text{Eq. 5}$$

Taking the maximum value across n ensures that a potential asynchrony (delay) between candidate pattern $w_i[n]$ and host signal is resolved. The pattern $w_i[n]$ that results in the highest correlation $r_i$ is selected and the associated payload bits are provided as reconstructed payload:

$$f = \underset{i}{\operatorname{argmax}} \ (r_i) \quad \text{Eq. 6}$$

Preferably, and in line with the spectro-temporal watermark level modification during embedding, the host signal is normalized (whitened) before correlation to reduce the variability in correlation due to the host signal itself.

For large patterns $w_i[n]$ (which are often required for sufficient robustness and transparency), the correlation operation given above is often performed in the frequency domain to reduce the computational complexity $$R_i[k] = Y[k] W_i[k]$$

with Y[k] being the frequency-domain (DFT) representation of y[n] of size k:

$$X[k] = \sum_n x[n] \exp[-2\pi j n k/K] \quad \text{Eq. 7}$$

The value for $r_i$ is then found by taking the maximum (peak) of $R_i[k]$ after computing the inverse DFT transform:

$$r_i = \max_n \sum_k R_i[k] \frac{\exp(2\pi j n k/K)}{K} \quad \text{Eq. 8}$$

The result, i.e. the pattern 121 is translated into the payload

Figure 3:
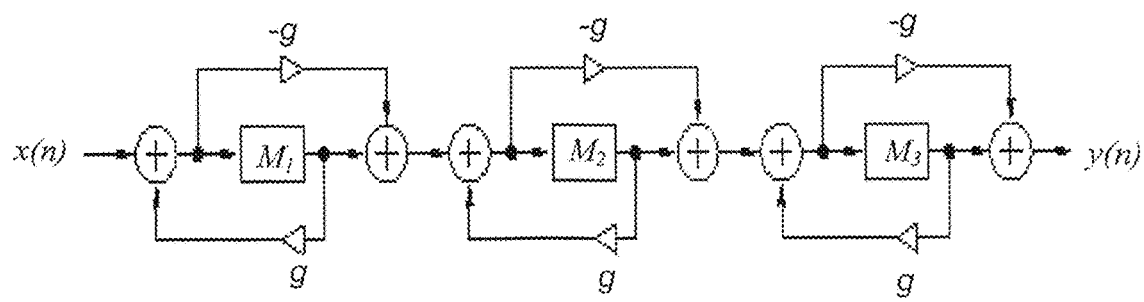
FIG. 3 shows cascade of 3 all pass-delay sections with gain variable g and delay M.

FIG. 3 shows cascade of 3 all pass-delay sections with gain variable g and delay M. As noted earlier, the invention is based on the insight that the correlation operation normally used in watermarking has similarities with the convolution operation of applying an finite-impulse response onto an input signal to obtain a filtered signal. This filter should be an infinite impulse response filter characterized by a semi-white frequency spectrum and provides a pseudo-random time-domain response.

Figure 4:
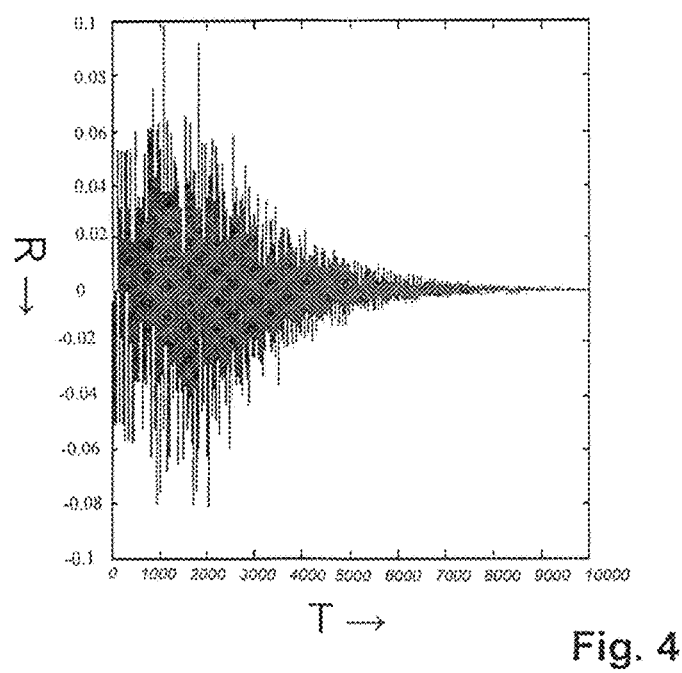
FIG. 4 shows an example impulse response of a cascade of 6 all pass-delay sections. In the figures, same reference numbers indicate same or similar features.

One class of filters that is so characterized is a cascade of all pass-delay sections. Because the filter response of an all pass filter is spectrally white, the cascade of such filters will also be spectrally white. By varying the gain and/or delay parameters of each all pass-delay section, different pseudo-random sequences can be generated. Furthermore, the number of sections, and the parameters of each section determine the length of the impulse response of the cascade. An example impulse response of a cascade of 6 all pass-delay sections is shown in FIG. 4. The horizontal axis shows the time, and the vertical axis the impulse response.

An important benefit of the cascade as detection process is its low computational complexity. A cascade of 6 all pass-delay sections requires only 6 delays and 12 multiply-accumulates for each audio input sample, which is in many cases significantly less (depending on the filter length) than frequency-domain correlation (requiring forward and backward FFTs).

A second benefit relies in the fact that this approach does not need an exhaustive frame-based search for synchronization. Each sample that is provided as input to the cascade all pass-delay detector will provide an output representing the correlation between the impulse response and all former input samples.

The above provides a description of several useful embodiments that serve to illustrate and describe the invention. The description is not intended to be an exhaustive description of all possible ways in which the invention can be implemented or used. The skilled person will be able to think of many modifications and variations that still rely on the essential features of the invention as presented in the claims. In addition, well-known methods, procedures, components, and circuits have not been described in detail.

The invention is preferably implemented in a computer program product, i.e. a collection of computer program instructions stored on a computer readable storage device for execution by a computer. The instructions of the present invention may be in any interpretable or executable code mechanism, including but not limited to scripts, interpretable programs, dynamic link libraries (DLLs) or Java classes. The instructions can be provided as complete executable programs, as modifications to existing programs or extensions ("plugins") for existing programs. Moreover, parts of the processing of the present invention may be distributed over multiple computers or processors for better performance, reliability, and/or cost.

Machine-readable storage devices suitable for storing computer program instructions include all forms of non-volatile memory, including by way of example semiconductor memory devices, such as EPROM, EEPROM, and flash memory devices, magnetic disks such as the internal and external hard disk drives and removable disks, magneto-optical disks and CD-ROM disks. The computer program product can be distributed on such a storage device, or may be offered for download through HTTP, FTP or similar mechanism using a server connected to a network such as the Internet. To this end one may connect a server system comprising the storage medium discussed above to a network, and arrange this server for allowing the instructions to be downloaded to client systems connected directly or indirectly to the network.

When constructing or interpreting the claims, any mention of reference signs shall not be regarded as a limitation of the claimed feature to the referenced feature or embodiment. The use of the word "comprising" in the claims does not exclude the presence of other features than claimed in a system, product or method implementing the invention. Any reference to a claim feature in the singular shall not exclude the presence of a plurality of this feature. The word "means" in a claim can refer to a single means or to plural means for providing the indicated function.

The invention claimed is:

1. A method of embedding a watermark pattern into a content segment, the method comprising:
   modifying the content segment to insert a set of features that relate to the watermark pattern, wherein at least a part of the set of features are imperceptible;
   determining an impulse response of a filter to be used for detecting the watermark pattern; and
   inserting the time-reversed impulse response of the filter into the segment as the set of features, wherein the filter is an infinite impulse response filter,
   wherein the infinite impulse response filter comprises a semi-white frequency spectrum and provides a pseudo-random time-domain response.

2. The method of claim 1, wherein the filter comprises a plurality of all pass delay sections, each producing a respective impulse response.

3. The method of claim 2, wherein the plurality is arranged in a cascade.

4. The method of claim 2, wherein two or more filters provide semi-orthogonal impulse responses, and the step of modifying inserts at least one of these responses.

5. The method of claim 4, further comprising modifying one or more of the respective impulse responses prior to embedding, the modification being dependent on the payload.

6. The method of claim 5, wherein information concerning the relationship between the responses of the two or more filters that are embedded is representative of the payload.

7. The method of claim 1, wherein the impulse response of the filter is truncated at an arbitrary point.

8. A method of detecting a watermark pattern representing a payload embedded as a watermark into a content segment, the method comprising:
   detecting a set of features that relate to the watermark pattern in the content segment, wherein at least a part of the set of features are imperceptible;
   applying a filter to the content segment, the filter being an infinite impulse response filter; and
   processing the output of the filter to obtain the watermark pattern from which to reconstruct the payload,
   wherein the infinite impulse response filter comprises a semi-white frequency spectrum and provides a pseudo-random time-domain response.

9. The method of claim 8, wherein the method comprising:
   applying a plurality of filters to the content segment multiple times, each filter outputting a different candidate watermark pattern form which to reconstruct the payload; and
   taking the response that has a best match with one candidate watermark pattern as the watermark pattern from which to reconstruct the payload.

10. A system for embedding a watermark pattern into a content segment, the system comprising:
    an embedding module for modifying the content segment to insert a set of features that relate to the watermark pattern, wherein at least a part of the set of features are imperceptible;
    a filter module configured for determining an impulse response of a filter to be used for detecting the watermark pattern,
    wherein the embedding module is configured to insert the time-reversed impulse response of the filter into the segment as the set of features,
    wherein the filter is an infinite impulse response filter, and
    wherein the infinite impulse response filter comprises a semi-white frequency spectrum and provides a pseudo-random time-domain response.

11. A system for detecting a watermark pattern representing a payload embedded as a watermark into a content segment, the system comprising:
    a detecting module for detecting a set of features that relate to the watermark pattern in the content segment, wherein at least a part of the set of features are imperceptible;
    a filter configured for application to the content segment, the filter being an infinite impulse response filter; and
    processing means for processing the output of the filter to obtain the watermark pattern from which the payload can potentially be reconstructed,
    wherein the infinite impulse response filter comprises a semi-white frequency spectrum and provides a pseudo-random time-domain response.

12. The method of claim 6, wherein the information relates to a relative delay between the responses or the relative phase or sign of the two or more watermark patterns.

* * * * *